Patented Oct. 10, 1939

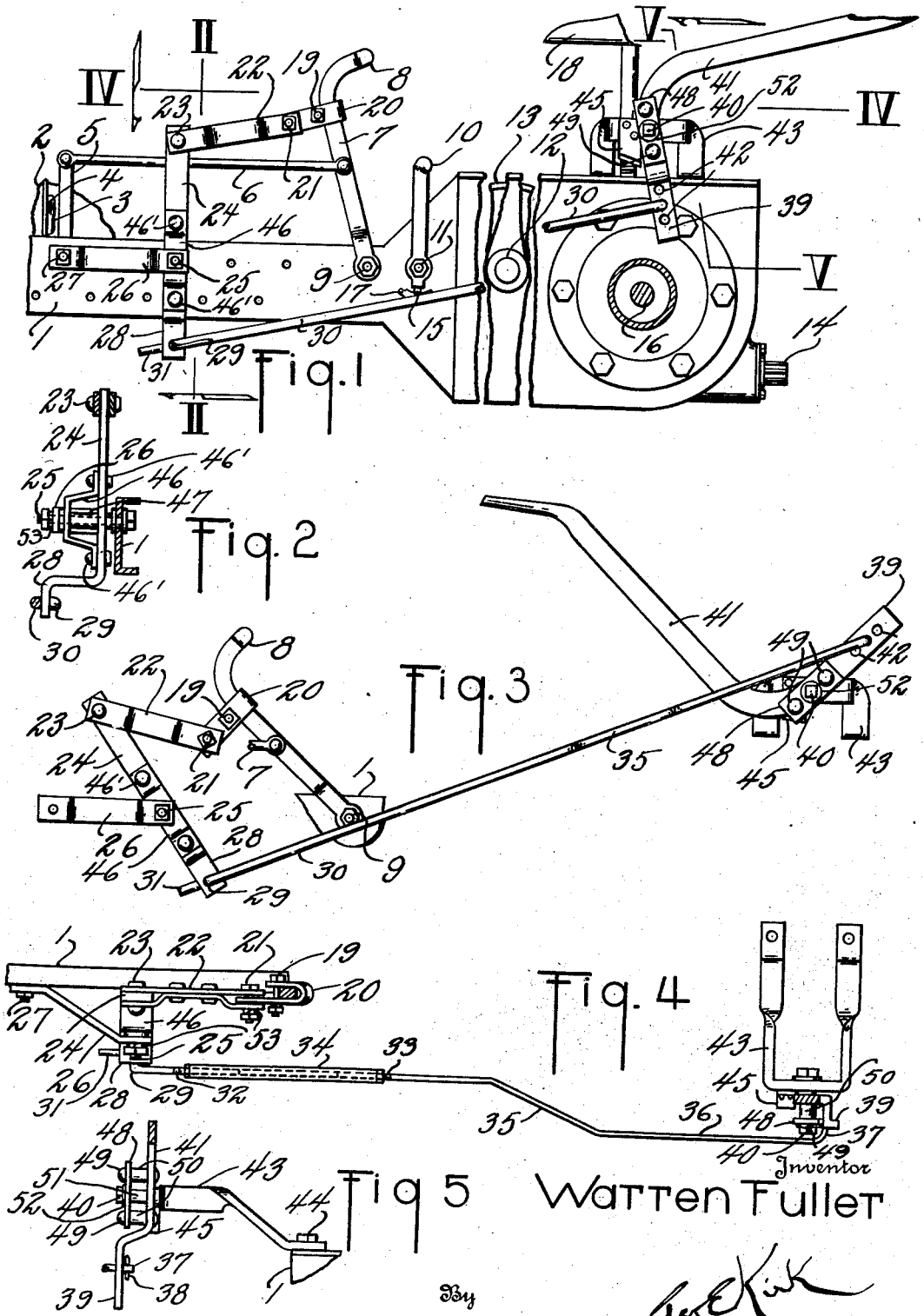

2,175,188

UNITED STATES PATENT OFFICE 2,175,188

CONTROL ACCESSIBILITY

Warren Fuller, Continental, Ohio, assignor to Charles S. Shisler, Oakwood, Ohio

Application June 24, 1937, Serial No. 150,125

3 Claims. (Cl. 74—481)

This invention relates to pedal and manual interconnection controls.

This invention has utility in the greater access for cutting-in and out one or more power driven means as from a tractor power plant.

Referring to the drawing:

Fig. 1 is a fragmentary view of an embodiment of the invention in connected position on a tractor;

Fig. 2 is a section on the line II—II, Fig. 1, showing the lever in the attachment transmission;

Fig. 3 is a view of the attachment at self-holding cut-in position for the clutch;

Fig. 4 is a plan view, with parts broken away, of the attachment (extensible) on the line IV—IV, Fig. 1; and Fig. 5 is a detail view of the hand lever mounting on the line V—V, Fig. 1.

Motor vehicle or tractor having frame 1 is provided with power plant 2 with clutch 3 normally held out by spring 4. Against resistance of this spring 4, arm 5 may be rocked by link 6 from clutch pedal 7 to overcome the action of this spring 4 and throw the clutch 3 out of driving connection with the power plant 2 when not held out by foot of the operator on foot seat 8 of the pedal 7. This pedal 7 has fulcrum 9 in the frame 1. Control connection or lever 10 has fulcrum 11 in the frame 1 adjacent the fulcrum 9 mounting the clutch foot pedal 7. The foot pedal 7, as operated, directly controls cutting in of power take-off shaft 12 having power take-off pulley 13 fixed therewith when the transmission to propulsion shaft 16 is in neutral.

As desired, the lever 10 may cut in and affect only power take-off 14. This additional power take-off shaft 14 extends rearwardly from the frame 1. At the throw-in position for this control lever 10, it may be automatically held by catch 15 so that when this foot lever 10 is thrown in, operation of the clutch pedal 7 may cut in the power take-off shaft independently of propulsion shaft 16 of the vehicle having the frame 1. At the different shifted position for this control lever 10 away from the catch 15 but to engage catch 17, the cutting in of the clutch pedal 7 and transmission are effective not only to operate the power take-off shafts 12, 14, but likewise to propel the vehicle through the propulsion shaft 16.

In the carrying out of the invention herein such is disclosed not to disturb the general control features as effective from the clutch pedal 7 and the auxiliary pedal 10. Accordingly it is possible to retain these features of control of the vehicle which may be effected by the operator in seat 18 and thereby in position conveniently to operate the pedals 7, 10, as well as otherwise control the progress and operation of the tractor. In order to adapt the invention hereto, bolt 19 in return bend 20 clamps this bend 20 as a bracket upon the clutch lever 7. This bracket has an arm extending from this return bend past the bolt 19 to bolt 21 as a pivot pin connecting link 22 with pivot 23 for pivotal engagement of the link 22 with upper arm 24 of lever having fulcrum bolt 25 in bracket 26 anchored by bolt 27 with the frame 1 of the vehicle. This lever having upper arm 24 normally extends downwardly past the fulcrum 25 to have arm 28 engaged by offset portion 29 of rod or link 30 precluding disengagement therefrom by extension 31 beyond the offset 29 adjacent the lever arm 28 on the side opposite from such arm from which the rod 30 extends rearwardly.

In practice, for general adaptation instead of having this rod 30 of fixed or constant length, there may be threaded portions 32, 33, as right and left hand members engaged by tubular internally threaded coupling 34, thereby effective to vary the length of this rod in its extent rearwardly, having offset 35 to clear the tractor housing and with straightaway portion 36 to terminal offset 37 anchored by split key 38 with short arm 39 of the hand lever having fulcrum 40 from which upwardly extends handle portion 41. In the attachment adjustment, say in the range wherein there is omitted the adjustment for link control, there may be different radial length openings 42 in the arm 39 for engagement by this rearwardly extending rod link. The fulcrum 40 is mounted in bracket 43 anchored by bolts 44 with the machine frame.

It is to be noted the clutch lever is so proportioned and the brackets so laid out that normal bolt holes or bolts in the frame 1 may have the nuts removed therefrom and the various brackets 27, 43, thus be attached in this assembly of a transmission. Shifting of the clutch lever 7 is definite and positive with no play or lost motion so that directly the clutch lever is thrown, at the same time the handle 41 is rocked. However, in the normal operation by the operator to throw out the clutch by pressure on the foot seat 8 of the clutch lever, the spring 3 is effective to resist such shifting toward clutch release. In the throwing through the connections from the handle 41, the extent of this throw may be to locate this rod link 30 to swing past the fulcrum 40 as a dead point and thus have the spring 3 effective for an additional purpose of holding this transmission connection and the clutch out from the selected drive, whether omitting the propulsion transmission 16 due to the position of the foot lever 10 or with such propulsion in as well as the take-off from which there may be connection either by pulley 13 or by drive take-off shaft 14 or both thereof. The configuration and location of this handle 41 is such that one attending the vehicle may operate this handle even from position in the seat without using the pedal. Furthermore, from the position standing on the ground or say upon a rear platform carried by the tractor, this vehicle operator may conveniently cut-in or cut-out the power plant, whether such be effective in vehicle propulsion, in power take-off, or both thereof.

At this line of action for the rod link 30 in which the handle 41 has located the line of action for this rod past the fulcrum 40 as a dead center, there is limit to this throw for the handle 41 due to stop 45 fixed with the bracket 43 and against which the hand lever abuts.

In the general set-up as herein disclosed and the adaptation of this attachment mounting directly upon the machine, availing of bolts or bolt holes as present, the brackets are substantially mounted. In view of the lever assemblage and the power applied or available, rigidity may be had in the embodiment to stabilize the fulcra against getting out of alignment as mounted. To this end the lever 24, 28, at its fulcrum 25 may have offset U-shaped section 46 having rivet assembly 46' with the respective arms 24, 28, in providing away from the lever 24, 28, bearing or mounting for sleeve 47 for or with the fulcrum pin 25 as the long bearing.

With similar purpose in view, fulcrum 40 for the lever 39, 41, has offset plate 48 assembled by rivets 49 and spacing sleeves 50 to provide a long bearing for holding sleeve 51 for or with the fulcrum 40. In the fulcra assemblies there may be washers 52 for contributing to freedom of relative rotation or rocking of the levers. Additionally, in assembly, where the nuts occur on the bolts spring washers 53 may be provided as well as lock washers and also at the mounting nuts for the bolts assembling the brackets with the tractor.

What is claimed and it is desired to secure by Letters Patent is:

1. A motor vehicle power plant attachment for a power cutting-in pedal embodying a clamp at the pedal, a link extending from the clamp, a lever pivotal on the vehicle having an arm connected to the link, a link rod extending from the other arm of the lever, a hand lever to which the rod is connected providing between the levers adjustable effective range for said rod, a fulcrum for the hand lever mountable on the vehicle and stop means for the hand lever effective past dead center line of action for the rod.

2. An attachment for a motor vehicle power plant wherein there is a clutch pedal for cutting the plant in and out, a propulsion connection for the vehicle, a power take-off connection from the vehicle, selective means for one or both of the connections as to the connection to be cut in by the clutch, and a spring normally holding the clutch as to driving transmission effectiveness between the power plant and said connection or connections, said attachment embodying a shiftable hand lever, a first link from the pedal, an additional link approximately parallel to the first link and extending from the handle, an additional lever remote from said hand lever connected to said links whereby the links and levers form a transmission connection adapted to have a holding position against said spring, said connection providing a range of shifting for the hand lever beyond effective shifting range for the pedal, and adjustable means for varying the effective length of the additional link between the hand lever and additional lever.

3. A tractor attachment embodying a hand lever, an approximately parallel additional lever, a first link between the levers, a connection between the hand lever and the first link, means whereby the effective length of said connection may be adjusted, and an additional shorter link from the additional lever adapted to connect with a tractor clutch pedal.

WARREN FULLER.